E. BURT.
FILTER.
APPLICATION FILED OCT. 19, 1908.

931,267.

Patented Aug. 17, 1909.
3 SHEETS—SHEET 1.

Witnesses:
G. A. Paubenschmitt
K. A. Costello

Inventor
Edwin Burt,
By Geo. E. Waldo,
Atty

UNITED STATES PATENT OFFICE.

EDWIN BURT, OF EL ORO, MEXICO.

FILTER.

No. 931,267.   Specification of Letters Patent.   Patented Aug. 17, 1909.

Application filed October 19, 1908. Serial No. 458,548.

*To all whom it may concern:*

Be it known that I, EDWIN BURT, a citizen of the United States, and a resident of El Oro, Estado de Mexico, Mexico, have invented certain new and useful Improvements in Filters, of which the following is a specification.

This invention relates to filters and relates particularly to rotary filters especially designed and adapted for treating and filtering ore slimes and the like, of the general type comprising a revoluble cylindrical shell provided on its inner surface with a suitable filtering medium.

In the operation of filters of the type to which my invention relates, the liquid portions of the pulp or slime percolate through the filtering medium and are then discharged from the filter, the solid portions of the pulp or slime being deposited on the inner surface of said filtering medium in the form of a slime cake made up of many successive layers, in convenient form to be further treated and thoroughly washed by the introduction into the filter of wash solutions and wash water, to insure that all of the solution carrying "values" will be removed therefrom before said filtrate is discharged.

Heretofore, filtration has commonly been effected through suction applied outside of the filtering medium, which will operate in an obvious manner to facilitate filtration. It is found, however, that the slime cake, consisting of the solid portion of the slime deposited on the filtering medium, is neither thick enough nor firm enough to hold its position on the filtering medium during the introduction of wash solutions, wash water, etc., but will fall by gravity unless held in position by either suction or pressure, thus affecting the operation to a considerable extent, necessarily involving extra manipulation of the filter and loss of whatever time is required for introducing compressed air and, at the same time, rendering the filter unreliable in its action, owing to the liability of the slime cake falling off on account of insufficient pressure, resulting in "ununiform" treatment of the slime cake, and, possibly, even necessitating the reforming of the slime cake on the filtering medium, which would involve large loss, both in time and labor.

The primary object of the invention is to overcome the foregoing objectionable features, by providing a filter so constructed and arranged that, in its operation, the slime cake deposited on the filtering medium will be thick enough and sufficiently firm and strong to "stand up" or adhere to the filtering medium without the use of air pressure within or suction from without, and until broken down by mechanical means.

Further objects of the invention are to provide a filter which will be evenly balanced, thus requiring a minimum of power to operate the same, and which will be substantially uniform at all times; to provide a filter the interior of which will be readily accessible for purposes of examination and repairs; to provide for conveniently treating the filtering medium with acid water to cleanse the same, when necessary; to eliminate small breakable parts, and, generally, to provide a filter of this general type, which will be simple and strong in construction, relatively cheap of manufacture and effective and economical in its operation.

To effect these various objects, a filter embodying my invention, comprises the various features, combinations of features and details of construction hereinafter described and claimed.

In the accompanying drawings, in which my invention is fully illustrated

My improved filter consists of a cylindrical shell 1 made of suitable sheet metal, as boiler plate, the ends of which are closed by suitable heads 2 and 3, of which the head 2 is permanently secured to the shell, while the head 3 is adapted to be opened and closed, in the manner presently described, for the purpose of discharging the contents of the filter and to afford access to the interior thereof, when desired.

The shell 1 is mounted so as to rotate freely. As shown, said shell is revolubly supported by means of a trunnion 4 on the head 2 which engages a suitable bearing in a pillow block 5 and by a roller bearing located between the ends of said shell consisting of a flange 6 rigidly secured to the outside of said shell, the perimeter of which runs on suitable antifriction rollers 7 mounted so as to rotate freely in fixed blocks 8.

My invention contemplates the use of any desired or approved means for supporting the head 3 of the shell 1 and for operating the same to open and close the end of said shell. As shown, said head is slidably mounted on rods 9, the opposite ends of which are secured in a flange 10 on the end of said shell and in a cross head 11, said cross head being preferably supported by means of a roller bearing substantially identical with the roller bearing which supports the shell 1 between its ends.

The head 3 is adapted to be opened and closed by means of a "double-acting" hydraulic jack, the cylinder 12 of which is secured to the cross head 11 and the plunger 13 to said head 3. Water under pressure is adapted to be supplied to said jack through suitable pipe connections with a pump or from a tank by gravity, neither being shown. To provide for tilting the shell, in the manner presently described, said pipe connection comprises a flexible section 15 and to provide for rotation of the section 16 of said pipe connection which communicates directly with the cylinder 12 of the hydraulic jack with the cross head 11, said pipe connection comprises a section 17 supported in fixed position on a bracket 18 on the frame of the filter with which the pipe section 16 communicates directly, a tight joint being formed between said sections 16 and 17 by means of a suitable stuffing box or packing gland, the pipe section 17 and the portion of the pipe section 16 which communicates therewith, being located in axial alinement with the shell 1 of the filter.

To prevent leakage around the head 3, a groove 19 is formed in the flange 10 on the shell 1 of the filter, which is adapted to be engaged by a corresponding flange or bead 20 on the head 3, a suitable packing, as a rubber ring or gasket 21, being provided in said groove 19.

Figures 7, 8:
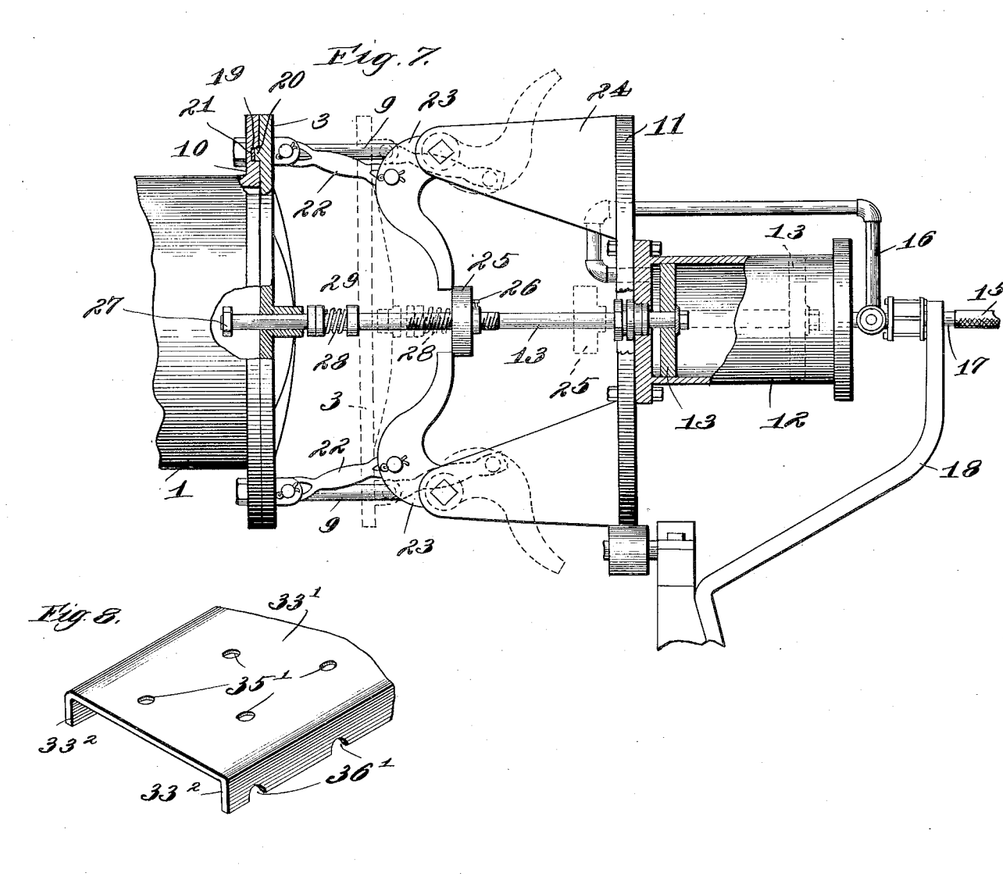
Fig. 7 is an enlarged view illustrating the means for operating the movable head of the filter, the position of parts corresponding to closed position of said head being shown in full lines, and the position of parts corresponding to open position of said head being shown in dotted lines.
Fig. 8 is a fragmentary perspective view on an enlarged scale of a modified form of filter plate.

If desired, suitable clamping means may be provided for securing the head 3 to the flange 10 against the pressure in the shell 1 after said head 3 has been moved into position by the hydraulic jack. In the preferable construction shown, however, I secure said head 3 in position against the force of the pressure within the shell of the filter by means coacting with said jack, consisting of toggle levers each comprising members 22 and 23, pivotally connected to the head 3 and to standards 24 on the cross head 11, respectively. The toggle members 22 and 23 are constructed and arranged to flex inwardly and the toggle members 23 are extended beyond the points of articulation of said lever members to each other so that, when the head 3 approaches its closed position, the ends of the toggle members 23 will project into the path of travel of a collar 25 on the plunger 13 of the hydraulic jack, the relation being such that the force of said hydraulic jack exerted on the projecting ends of said toggle members 23 through said collar 25 will operate to straighten said toggles and thus to exert a powerful pressure on the head 3 sufficient to hold it in position against the force of the pressure within the shell 1 of the filter, in an obvious manner.

To provide for adjusting the position of the collar 25 relatively to the toggle members 23, said collar is preferably adjustable on the plunger 13, being shown as screw threaded thereto. Said collar is adapted to be secured in adjusted position by suitable means, as by a set screw 26. To provide for necessary movement of the collar 25 to operate said toggles, the end of the plunger 13 is slidably fitted to a suitable bearing in the head 3. Retraction of said head 3, when the hydraulic jack is operated in the proper direction, is effected by a nut 27, or the like, secured to the end of the plunger 13, which projects through said head.

Primarily, the pivotal movement of the toggle members 23 is controlled by movement of the head 3 and to provide for turning said toggle members pivotally as said head approaches its closed position, so that the inner ends thereof will project into the path of travel of the collar 25, said head is held yieldingly in contact with the nut 27, as by a coiled spring 28 inserted between a collar 29 rigidly secured to the plunger 13 and a rigid part of said head, the relation being such as to provide for sufficient endwise movement of the plunger 13 relatively to the head 3 to exert a desired pressure on said head when closed and such, also, as to permit retraction of the collar 25 out of the path of travel of the inner ends of the toggle members 23 when the head 3 is opened.

While I have herein shown my improved means for securing the head 3 in closed position in connection with the plunger of a hydraulic jack, it is obvious that said locking means may be employed equally well with any other well known form of plunger, as by a suitable screw jack.

Rotation is adapted to be imparted to the shell 1 of the filter by any suitable means, as shown, by a pinion 30 secured to the shaft of a motor indicated at 31, said pinion meshing with a gear 32 secured to rotate with the shell, being, as shown, formed directly on the head 2.

Figures 1, 2, 6:
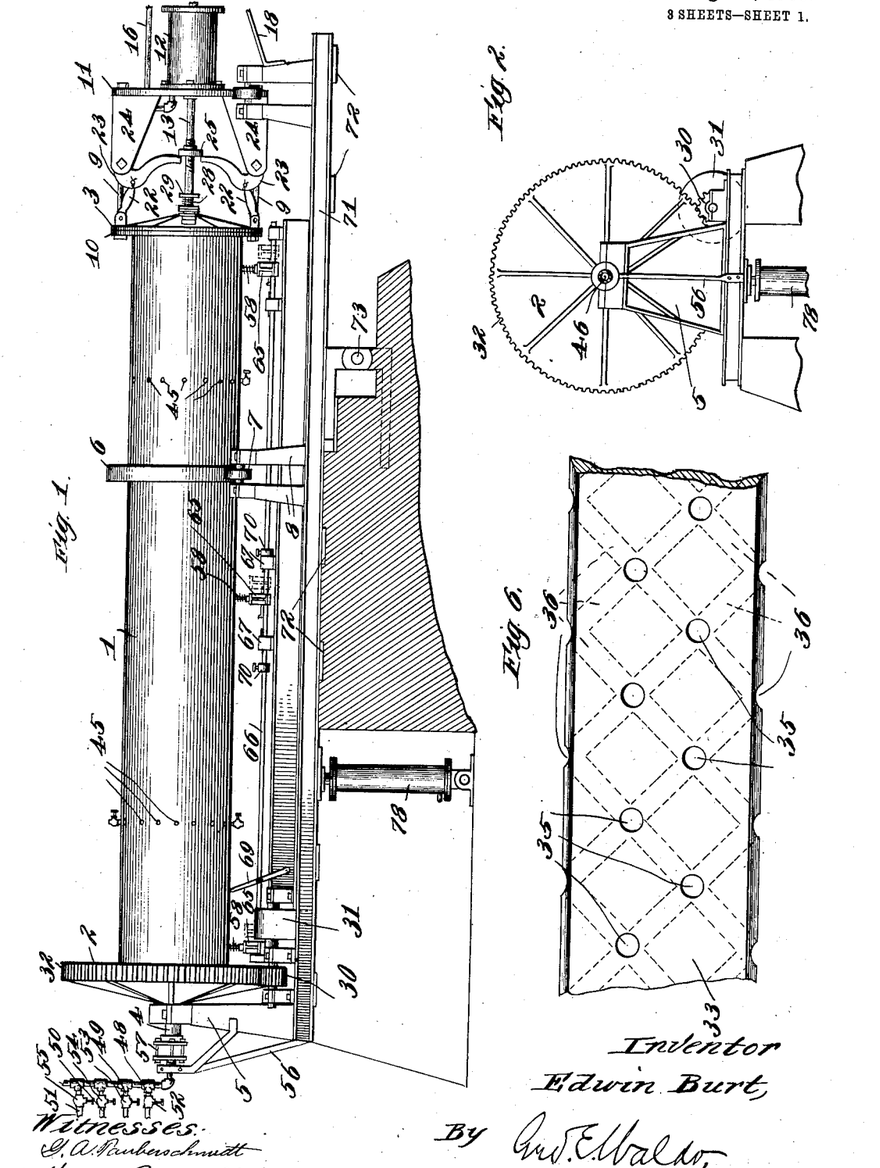
—Figure 1 is a side view of my improved rotary filter.
Fig. 2 is a rear end view thereof.
Fig. 6 is an enlarged view of one of the filter plates showing the manner of perforating and scoring the same.

The filter shell 1 is provided on its inner surface with a suitable filtering medium consisting, as shown, of boards 33 which extend lengthwise of said shell and are secured directly to the inner surface thereof. The boards 33 are separated by spaces 34 and are provided with holes or openings 35 which extend through the same and are also provided on their rear surfaces, that is, their surfaces adjacent to the shell 1, with grooves or channels 36 which connect the holes or openings 35, said grooves or channels 36 preferably extending transversely and "cutting out" at the edges of said boards so as to communicate with the spaces 34 between said boards.

Any desired or approved means may be used for securing the boards 33 in position. As shown, said boards are held in position by means of bolts 37, which extend through holes or openings in said boards and in the filter shell 1, the heads 38 of said bolts bearing against the inner sides of said boards 33 and nuts 39 being threaded to the ends thereof which project outside of the shell 1. Suitable packing means, as rubber washers or gaskets 40, inserted between said nuts and the outside of said shell form tight joints and prevent leakage around said bolts. As shown, the heads 38 of said bolts 37 are made long and narrow and are curved under their heads in such manner that when secured in position with their long dimension extending transversely of the boards 33, said curve will extend substantially parallel with the inner surface of the filter shell 1. Thus, by turning said nuts down tight, the boards 33 may be made to conform substantially to the inner surface of said filter shell 1.

Figures 3, 4, 5:
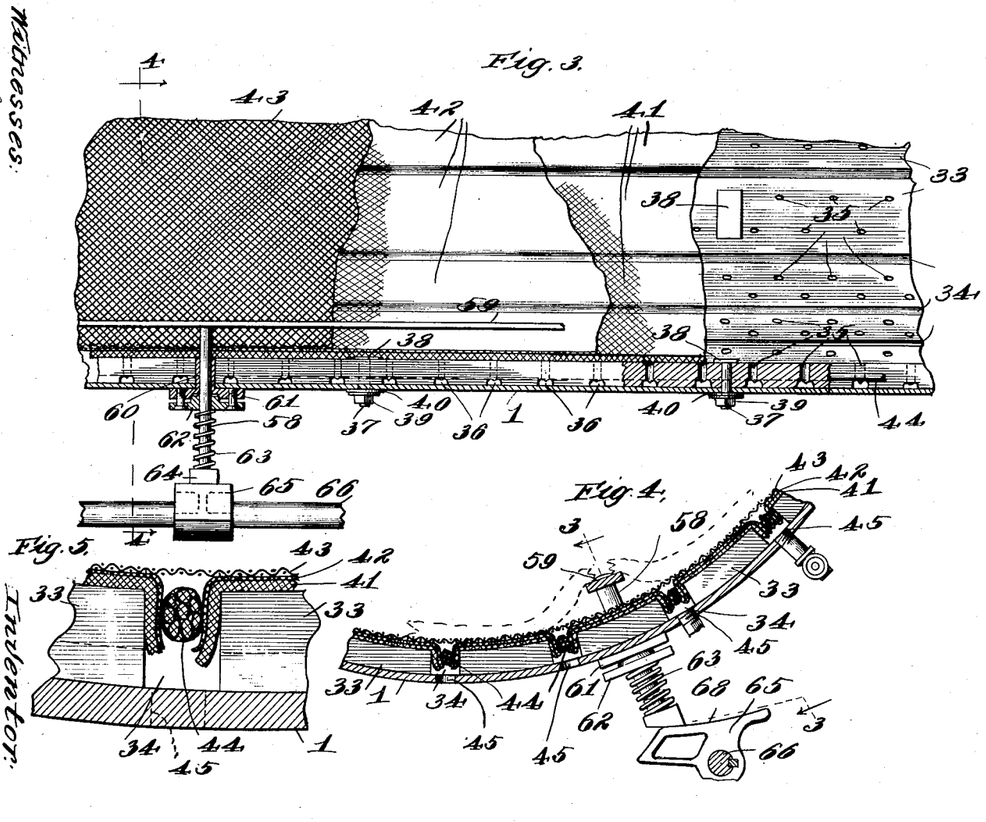
Fig. 3 is a sectional elevation, on an enlarged scale, taken substantially on the line 3—3 of Fig. 4.
Fig. 4 is a fragmentary sectional elevation on an enlarged scale, taken substantially on the line 4—4 of Fig. 3.
Fig. 5 is an enlarged fragmentary detail sectional view showing the manner of securing the filtering medium to the perforated filter plates.

The filter proper is secured directly to the inner surfaces of the boards 33, consisting, as shown, of successive layers 41, 42 and 43 of coarse, loosely woven cloth, as cocoa matting or the like, canvas and wire screen, said wire screen preferably having a coarse mesh, say ¼ of an inch square.

To provide for conveniently renewing the filtering medium in sections, without disturbing other parts thereof, each board 33 is covered with separate pieces of cocoa matting and canvas held in place by means of pieces of Manila rope 44 driven into the spaces 34 between said boards 33 so as to wedge said sections of cocoa matting and canvas in position. With this construction, when it is desired to remove, renew or replace any section of said cocoa matting and canvas, this can be done by disengaging the pieces 44 of Manila rope which secure the pieces or sections of cocoa matting and canvas which it is desired to remove in position, stripping off the section or sections of cocoa matting and canvas thus released, replacing them with others and again driving the pieces of Manila rope 44 into the spaces 34. The wire screen 43 is primarily designed to protect the canvas 42 from wear and is continuous over the entire surface of the filter. The boards 33 thus form supports for the filtering medium proper, while the holes or openings 35 and the grooves or channels 36 provide necessary drainage for conducting the liquid which passes through said filter to discharge holes or openings 45 formed in the shell 1 of the filter, preferably in line with the spaces 34 between the boards 33. The holes or openings 45 discharge into any suitable receptacle, not shown, in which the liquid discharged therefrom is collected for subsequent treatment in any desired manner. To adapt the filter for "treating" ores as well as for filtering slimes, stop cocks are preferably secured in the discharge holes or openings 45, by closing which the cyanid or other solution may be retained in the shell 1 for any desired length of time in order to extract the "values" from the pulverized ore.

The shell 1 of the filter is provided with pipe connections as follows:—Formed in the supporting trunnion 4 is an axial hole or opening 46 into which extends a pipe 47, which is in controlled communication with other pipes adapted for supplying the material to be filtered and other liquids and fluids used in the treatment thereof to the filter. As shown, my improved filter is designed for filtering ore slimes, and the pipe connections comprise four pipes 48, 49, 50 and 51, controlled, respectively, by valves 52, 53, 54 and 55, the pipe 48 forming a connection to the slimes tank, the pipe 49 to a tank containing wash solution, the pipe 50 with a source of supply of wash water and the pipe 51 with a source of supply of air under pressure. As shown, the pipe 47 is supported in fixed axial alinement with the shell 1 of the filter by a bracket 56 secured to the filter press frame, and a tight joint is maintained around said pipe 47 by means of a stuffing box 57, of any usual or approved construction.

In the operation of my improved filter, the shell 1 having been set in rotation, the valve 52 controlling the pipe 48 which communicates with the slime tank, is opened, whereupon slime is admitted to the shell 1 of the filter. When the filter is about one-half filled with slime, the valve 52 is closed, shutting off the supply of slime, and the valve 55, controlling the air supply pipe 51 is opened, thereby admitting air under pressure to the filter, the initial air pressure being preferably about ten pounds and being gradually increased to about fifty or sixty pounds. The air pressure in the shell of the filter will very greatly facilitate the filtering operation.

Obviously, as the shell 1 of the filter rotates and the liquid portion of the slime contained therein is forced out, the solid portion of said slime will deposit on the filter in the form of successive comparatively thin layers and the air pressure within the shell 1 of the filter, operating on these layers in succession, will compress or compact them into a firm, strong cake.

When the liquid portion of the slime contained in the filter has all been forced out, the valve 53 in the wash solution pipe 49 will be opened, thus admitting wash solution to the filter. When a sufficient quantity of wash solution has been admitted, the valve 53 is closed and the valve in the air supply pipe again opened and the filtering process repeated under pressure, until the wash solution has been all forced out. The slime cake on the filtering medium will be treated with wash solution in this manner as many times as may be necessary to extract all of the "values" therefrom, after which the wash water pipe 50 is opened, admitting wash water to the shell of the filter, which is also filtered off in the same manner as the wash solution. The washing operation may likewise be repeated as many times as may be necessary to remove all of the treatment solution from the slime cake on the filter.

Whereas, in all other filters of this type of which I have any knowledge, it has been found necessary to introduce air pressure into the shell of the filter during the introduction of the various wash solutions thereto, in order to prevent the slime cake from falling off from the filter, I am able, by the use of compressed air, to form a slime cake on the filter which will be sufficiently firm and strong to "stand up" or adhere to the filter without being supported by air pressure from within or suction from without. The strength of the slime cake is also enhanced by its arched shape, due to the cylindrical form of the filter. In fact, where filtration is effected under an air pressure of from fifty to sixty pounds in a cylindrical filter, I have found that it is necessary to break down or dislodge the slime cake by mechanical means when it is desired to discharge the same from the filter. While my invention contemplates the use of any desired means for thus dislodging the slime cake, desirable means for the purpose are as follows:—Fitted to suitable bearings which extend through the shell 1 of the filter and the filter proper secured to the inside thereof, so as to be longitudinally movable therein, are rods 58 to the inner ends of which is secured a bar 59 which extends lengthwise of the filter. As shown, the bearings for said rods 58 consist of bushings 60 which extend through the shell 1 of the filter and the filter proper secured to the inside thereof, said bushings being secured to the shell 1 by means of flanges 61 on the outer ends thereof which are secured to the shell 1 by means of rivets or the like. Tight joints are maintained around the rods 58 by means of suitable packing glands 62. The rods 58 are maintained normally at the limit of their retraction and the bar 59 normally in contact with the surface of the filtering medium, by means of springs 63 inserted between heads 64 on said rods 58 and the side of the shell 1. Thus, as the slime cake deposits, it will cover the bar 59 so that by forcing the rods 58 inwardly, which will operate to force the bar 59 away from the filtering medium, a section of slime cake extending substantially the entire length of the filter will be detached or dislodged, thus breaking the arch of the slime cake and permitting the remaining portions thereof to fall off or away from the surface of the filter by gravity, as the shell 1 of the filter rotates.

As shown, the rods 58 are adapted to be thus forced inwardly to break the arch of the slime cake by means of suitable trips or cam plates 65 rigidly secured to a shaft 66 splined to suitable bearings in fixed blocks 67 so as to be slidably held against rotation. Said trips or cam plates 65 comprise surfaces 68 which, when the shaft 66 is moved endwise to bring said trips or cam plates into operative position, extend eccentrically to the surface of the shell 1 of the filter, the relation being such that they converge toward the surface of the filter in the direction of rotation thereof and the relation being such, also, that, when they are in operative or tripping position, rotation of the shell 1 of the filter will cause the outer ends of the heads 64 of the rods 58 to engage the surfaces 68 on the trips or cam plates 65 at a considerable distance in advance of their points of closest approach to the surface of the shell 1, whereby continued rotation of said shell will operate to force the rods 58 inwardly, carrying with them the bar 59, which will thus be forced away from the surface of the filter and will break down or dislodge any slime cake thereon in the manner desired. To reduce wear, the ends of the heads 64 of the rods 58, which engage the surfaces 68, are made to conform substantially to the shape of said surfaces 68, thus providing relatively large bearing surfaces between said rods and said cam surfaces.

The trips or cam plates 65 are of such shape and are so positioned that by moving the shaft 66 endwise, said trips or cam plates may be moved both into and out of the paths of travel of the rods 58, as indicated in dotted lines in Fig. 1. As shown, the shaft 66 is adapted to be moved endwise, to bring the trips or cam plates 65 thereon into and out of operative position, by means of a lever 69, pivotally connected to said shaft and to a fixed support, respectively.

The positions of the shaft 66 corresponding to operative and inoperative positions, respectively, of the trips or cam plates 65, are defined by suitable stops, consisting, as shown, of collars 70 secured to the shaft 66 on opposite sides of a rigid part, as on opposite sides of one of the bearing blocks 67, preferably by means of set screws, to provide for adjusting the positions thereof and thus the movement of the shaft 66 and the extreme positions of the cam plates or trips 65.

Where an ample supply of water is available, I prefer to discharge the slime cake from the shell 1 in the following manner:— After the slime cake has been thoroughly washed with wash solution and finally washed with wash water and all of the "values" have been extracted therefrom, a sufficient quantity of water is run into the filter to repulp all of the slime cake. Said slime cake is then broken down or dislodged from the filter by means of the bar 59, in the manner heretofore described, and the shell 1 of the filter is rotated until the entire solid slime cake is repulped. The head 3 of the shell 1 of the filter is then retracted or opened, whereupon the contents of the filter will run out. As stated, I consider this method of discharging the slime cake from the filter preferable, for the reason that where the available supply of water is sufficient to admit of its being used, the filter shell 1 may be of almost any desired length, even up to sixty feet, thus affording very great capacity at very little increased cost. Where the supply of water available is not sufficient to warrant this method of discharging the slime cake from the filter, I contemplate merely dislodging or detaching the slime cake from the filter by means of the bar 59, as described, and then discharging said slime cake from the filter in solid form. To effect this, the shell 1 of the filter is supported in such manner that it may be turned into inclined position, with its discharge end lowermost, so that, when the head 3 is opened, rotation of the shell 1 will cause the solid slime cake to roll out at the open end of the filter. To provide for thus tilting the shell 1, the entire filter is mounted upon a suitable frame, consisting, as shown, of longitudinal channel bars 71 rigidly connected by means of plates 72 to form a substantially unitary structure. Said frame is pivotally supported so as to be movable about a transverse axis, preferably located beneath the same and slightly in front of its center, longitudinally, as at 73. Applied to said frame in the rear of the pivotal axis 73, is a hydraulic jack, indicated at 78, adapted for imparting movement to said frame and to the filter carried thereon about the axis 73.

In practice I have found that only a small inclination or tilting of the filter is necessary in discharging the contents thereof, say an inclination of about one foot in twenty. This can, however, be varied, as desired, to meet conditions.

When the contents of the filter are discharged in solid form, the length of the filter shell 1 will be considerably shorter than where the slime cake is repulped, a maximum length being about thirty feet.

As previously stated, where the press is constructed so as to tilt, all of the pipe and other connections thereto will necessarily comprise flexible sections so that they will not be strained or broken in the operation of the filter.

As a modification of my improved filter, I contemplate substituting for the boards 33, which form the base or support of the filtering medium, any suitable form of plate adapted to effect the objects of the invention as they relate thereto.

In Fig. 8 of the drawings, I have shown one form of plate which can be thus substituted for the boards 33. Said plate, designated $33^1$, is made of suitable sheet metal, as galvanized iron, of proper thickness to provide requisite strength, say about 14 gage, the lateral edges of said plate being turned substantially at right angles to the main part thereof to form flanges $33^2$ adapted to rest in contact with the inner surface of the shell 1 of the filter and to support the main portion thereof at a distance from the shell, say one-half inch (1/2"). The plate $33^1$ is provided in its main part with perforations $35^1$ which correspond with the holes or openings 35 in the boards 33 and preferably, also, with holes $36^1$ formed in the edges of the flanges $33^2$, which correspond to the channels 36 in the boards 33.

In the claims, I have used the term "plates" to designate, generically, the boards 33, the plates $33^1$ or any substitute therefor designed to effect the same objects.

I claim:—

1. A filter comprising a rotatable shell, heads which close the ends thereof, means for rotating said shell and a filtering medium secured to the inner surface of said shell, said filtering medium comprising plates secured to the inner surface of said shell provided with drainage holes and passages, means for securing said plates in position comprising bolts which extend through said plates and through the shell, said bolts having elongated heads designed to engage said plates transversely, the under surfaces of said heads conforming substantially to the curvature of the shell and nuts threaded to the ends of said bolts outside of said shell, whereby, by tightening said nuts, said plates may be made to conform substantially to the shape of the inner surface of the shell.

2. A filter comprising a rotatable shell, heads which close the ends thereof, means for rotating said shell and a filtering medium secured to the inner surface of said shell, said filtering medium comprising plates secured to the inner surface of said shell, said plates being spaced apart to provide passageways between adjacent plates and being provided with holes or openings which extend through the same and with channels on the sides thereof adjacent to the shell of the filter which connect said holes or openings with the passageways between said plates and said filter being provided with drainage openings for discharging the filtrate which communicate with the passageways between said plates, and filtering material secured to the inner surfaces of said plates, said filtering material comprising separate sections adapted for covering each of said plates and means for securing said sections of filtering material in position, said means consisting of strips forced into the spaces between said plates above the bottoms thereof so as to clamp the edges of said sections of filtering material thereto but without obstructing the channels between said plates adjacent to the shell of the filter.

3. A filter comprising a rotatable shell, heads which close the ends thereof, means for rotating said shell and a filtering medium secured to the inner surfaces of said shell, said filtering medium comprising plates secured to the inner surface of said shell, said plates being spaced apart to provide passageways between adjacent plates and being provided with holes or openings which extend through the same and with channels on the sides thereof adjacent to the shell of the filter which connect said holes or openings with the passageways between said plates and said filter being provided with drainage openings for discharging the filtrate which communicate with the passageways between said plates, and filtering material secured to the inner surfaces of said plates, said filtering material comprising separate sections adapted for covering each of said plates, and means for securing said sections of filtering material in position, said means consisting of pieces of Manila rope or the like forced into the spaces between said plates above the bottoms thereof so as to clamp the edges of said sections of filtering material thereto but without obstructing the channels between said plates adjacent to the shell of the filter.

4. A filter comprising a rotatable shell, heads which close the ends thereof, means for rotating said shell and a filtering medium secured to the inner surface of said shell, said filtering medium comprising plates secured to the inner surface of said shell, said plates being spaced apart to provide passageways between adjacent plates and being provided with holes or openings which extend through the same and with channels on the sides thereof adjacent to the shell of the filter which connect said holes or openings with the passageways between said plates and said filter being provided with drainage openings for discharging the filtrate, which communicate with the passageways between said plates, and filtering material secured to the inner surfaces of said plates, said filtering material comprising separate sections adapted for covering each of said plates and means for securing said sections of filtering material in position, said means consisting of strips forced into the spaces between said plates above the bottoms thereof so as to clamp the edges of said sections of filtering material thereto but without obstructing the channels between said plates adjacent to the shell of the filter, and a screen covering said filtering medium, said screen being continuous over the entire exposed surface thereof.

5. A filter comprising a rotatable shell, heads which close the ends thereof, comprising a head constructed and arranged to open and close, means carried by said shell for supporting and guiding said head when in open position and means for rotating said shell.

6. A filter comprising a rotatable shell, heads which close the ends thereof, comprising a head constructed and arranged to open and close, and means for supporting and guiding said head when open, said means comprising rods rigidly secured to said shell, said head being provided with bearings slidably fitted to said rods.

7. A filter comprising a rotatable shell, heads which close the ends thereof, comprising a head constructed and arranged to open and close, means for supporting and guiding said head when open, said means comprising a cross head, rods which rigidly connect said cross head with the shell of the filter, said head being provided with bearings slidably fitted to said rods, and means for opening and closing said head, said means comprising a jack mounted on said cross head one member of which is connected to said head.

8. A filter comprising a rotatable shell, heads which close the ends thereof comprising a head constructed and arranged to open and close to provide for discharging the contents of said filter and for access to the interior thereof, a pivotal support for said shell transverse to its axis of rotation, whereby said shell may be turned into inclined position, and means for rotating said shell about its longitudinal axis both in normal and inclined positions.

9. A filter comprising a shell, heads which close the ends of said shell comprising a head constructed and arranged to open and close to provide for discharging the contents of said shell and for access to the interior thereof, a supporting frame on which said shell is rotatably mounted, a pivotal support for said supporting frame transverse to the axis of rotation of said shell, and means mounted on said supporting frame for rotating said shell whereby said shell may be rotated both in normal and inclined positions.

10. A filter comprising a shell, heads therefor, means for supporting and guiding one of said heads so that it will be movable toward and from the end of said shell to provide for opening and closing the same, said supporting and guiding means comprising rods rigidly secured to said shell and said head being provided with bearings which positively engage said rods so that the heads will be slidable thereon.

11. A filter comprising a shell, heads therefor comprising a head constructed and arranged to open and close, and means for securing said movable head in closed position, said means comprising a jack and toggle levers which connect said movable head with suitable supports fixed relatively to the shell of the filter, said toggle levers comprising members constructed and arranged for engagement by a rigid part of the jack plunger as said movable head approaches closed position.

12. A filter comprising a shell, heads therefor comprising a head constructed and arranged to open and close, means for operating said movable head and for securing the same in closed position, said means comprising a jack the plunger of which is slidably connected to said movable head and toggle levers which connect said movable head with suitable supports fixed relatively to the shell of the filter, said toggle levers comprising members constructed and arranged for engagement by a rigid part of the jack plunger as said head approaches closed position.

13. A filter comprising a shell, heads therefor comprising a head constructed and arranged to open and close, means for operating said movable head and for securing the same in closed position, said means comprising a jack the plunger of which is slidably connected to said movable head, a collar secured to the jack plunger so as to be adjustable lengthwise thereof and toggle levers which connect said movable head with suitable supports fixed relatively to the shell of the filter, said toggle levers comprising members constructed and arranged for engagement by the collar on said jack plunger as said movable head approaches closed position.

14. A filter comprising a shell, heads therefor comprising a head constructed and arranged to open and close, means for operating said movable head and for securing the same in closed position, said means comprising a jack the plunger of which is slidably connected to said movable head, a collar secured to the jack plunger so as to be adjustable lengthwise thereof and toggle levers which connect said movable head with suitable supports fixed relatively to the shell of the filter, said toggle levers comprising members constructed and arranged for engagement by the collar on said jack plunger as said movable head approaches closed position, and means for maintaining said head yieldingly at the outer limit of its movement relatively to the jack plunger.

15. A filter comprising a rotatable shell, a filtering medium secured to the inner surface of said shell and means for dislodging the filter cake from said filtering medium, said means comprising actuating means located outside of the shell of the filter.

16. A filter comprising a rotatable shell, a filtering medium secured to the inner surface of said shell and means rendered operative by the rotation of said shell for dislodging the filter cake from said filtering medium, said means comprising actuating means located outside of the shell of the filter.

17. A filter comprising a rotatable shell, a filtering medium secured to the inner surface of said shell, means for dislodging the filter cake from said filtering medium and means for rendering said filter cake dislodging means both operative and inoperative.

18. A filter comprising a rotatable shell, a filtering medium secured to the inner surface of said shell and means for dislodging the filter cake from said filtering medium, said means comprising a bar which extends lengthwise of said filter constructed and arranged to rest in contact with the surface of said filtering medium, rods secured thereto slidably fitted to suitable bearings which extend through the filtering medium and the shell of the filter, said rods projecting outside of said shell.

19. A filter comprising a rotatable shell, a filtering medium secured to the inner surface of said shell and means for dislodging the filter cake from said filtering medium, said means comprising a bar which extends lengthwise of said filter constructed and arranged to rest in contact with the surface of said filtering medium, rods secured thereto slidably fitted to suitable bearings which extend through the filtering medium and the shell of the filter, and means for maintaining said bar normally in contact with the surface of the filtering medium.

20. A filter comprising a rotatable shell, a filtering medium secured to the inner surface of said shell, means for dislodging the filter cake from said filtering medium, said means comprising a bar which extends lengthwise of said filter constructed and arranged to rest in contact with the surface of said filtering medium, rods secured thereto, slidably fitted to suitable bearings which extend through the filtering medium and the shell of the filter, said rods projecting outside of said shell, and springs applied to said rods adapted for maintaining said bar normally in contact with the surface of the filtering medium.

21. A filter comprising a rotatable shell, a filtering medium secured to the inner surface of said shell, means for dislodging the filter cake from said filtering medium, said means comprising a bar which extends lengthwise of said filter constructed and arranged to rest in contact with the surface of said filtering medium, rods secured thereto slidably fitted to suitable bearings which extend through the filtering medium and the shell of the filter, said rods projecting outside of said shell, means for maintaining said bar normally in contact with the surface of the filtering medium, and cam plates provided with suitable cam surfaces movably supported outside of said shell so as to bring the cam surfaces thereon into and out of the path of travel of rigid parts of said rods, whereby said filter cake dislodging means may be rendered both operative and inoperative, as desired.

22. A filter comprising a rotatable shell, a filtering medium secured to the inner surface of said shell, means for dislodging the filter cake from said filtering medium, said means comprising a bar which extends lengthwise of said filter constructed and arranged to rest in contact with the surface of said filtering medium, rods secured thereto slidably fitted to suitable bearings which extend through the filtering medium and the shell of the filter, said rods projecting outside of said shell, means for maintaining said bar normally in contact with the surface of the filtering medium, cam plates provided with suitable cam surfaces, a shaft on which said cam plates are mounted, and means for imparting movement to said shaft to bring the cam surfaces on said cam plates into and out of the path of travel of rigid parts of said rods, whereby said filter cake dislodging means may be rendered both operative and inoperative, as desired.

23. A filter comprising a rotatable shell, a filtering medium secured to the inner surface of said shell, means for dislodging the filter cake from said filtering medium, said means comprising a bar which extends lengthwise of said filter constructed and arranged to rest in contact with the surface of said filtering medium, rods secured thereto slidably fitted to suitable bearings which extend through the filtering medium and the shell of the filter, said rods projecting outside of said shell, means for maintaining said bar normally in contact with the surface of the filtering medium, cam plates provided with suitable cam surfaces, a shaft to which said cam plates are rigidly secured, fixed bearing blocks provided with bearings to which said shaft is splined so as to be movable endwise therein so as to bring the cam surfaces on the cam plates carried thereby into and out of the path of travel of rigid parts of said rods, whereby said filter cake dislodging means may be rendered operative and inoperative, as desired.

In testimony, that I claim the foregoing as my invention, I affix my signature in presence of two subscribing witnesses, this 29th day of September, A. D. 1908.

EDWIN BURT.

Witnesses:
W. M. CAHOONE,
R. PHILLIPS.